United States Patent [19] [11] Patent Number: 4,521,947
Nonnenmann et al. [45] Date of Patent: Jun. 11, 1985

[54] METHOD FOR MANUFACTURING A CATALYTIC REACTOR CARRIER MATRIX

[75] Inventors: Manfred Nonnenmann, Schwieberdingen; Heinrich Oltmanns, Eberdingen; Manfred Hohhäusel, Stuttgart, all of Fed. Rep. of Germany

[73] Assignee: Süddeutsche Kühlerfabrik Julius Fr. Behr GmbH & Co. KG., Fed. Rep. of Germany

[21] Appl. No.: 428,452

[22] Filed: Sep. 30, 1982

Related U.S. Application Data

[63] Continuation of Ser. No. 156,486, Jun. 4, 1980, Pat. No. 4,381,590.

[30] Foreign Application Priority Data

Jun. 19, 1979 [DE] Fed. Rep. of Germany ....... 2924592

[51] Int. Cl.³ ............................................. B23P 13/00
[52] U.S. Cl. ........................... 29/157 R; 29/163.5 F; 29/DIG. 4; 228/182; 228/248; 228/256; 228/261; 228/173.6; 228/173.7; 422/177; 422/181
[58] Field of Search .............. 29/157 R, 163.5 F; 228/173 C, 173 D, 181, 182, 183, 248, 253, 256, 261, 36, 43, 219; 156/191; 118/227; 239/374; 422/177, 181

[56] References Cited

U.S. PATENT DOCUMENTS

| 1,243,654 | 10/1917 | Clark | 228/261 X |
|---|---|---|---|
| 1,451,758 | 4/1923 | Breyer | 228/256 X |
| 1,806,738 | 5/1931 | Burns et al. | 228/261 X |
| 2,168,222 | 8/1939 | Lanes | 118/227 |
| 2,555,125 | 5/1951 | Gregory | 29/163.5 F |
| 2,573,835 | 11/1951 | Dyar | 118/227 |
| 2,674,299 | 4/1954 | Bruker | 118/227 X |
| 2,918,028 | 12/1959 | Wright | 228/256 X |
| 2,961,222 | 11/1960 | Butt | 228/183 X |
| 3,006,318 | 10/1961 | Monroe, Jr. et al. | 118/227 |
| 3,009,180 | 11/1961 | Schramm | 118/227 UX |
| 3,009,241 | 11/1961 | Giovannucci | 228/181 X |
| 3,043,721 | 7/1962 | Burnes | 118/227 X |
| 3,092,513 | 6/1963 | Browning | 118/227 X |
| 3,110,961 | 11/1963 | Melill et al. | 228/219 X |
| 3,162,546 | 12/1964 | Jefferys | 118/227 X |
| 3,188,732 | 6/1965 | Feduska | 228/181 |
| 3,208,131 | 9/1965 | Ruff et al. | 29/157 R |
| 3,300,836 | 1/1967 | Slater et al. | 228/219 X |
| 3,338,499 | 8/1967 | Gilbert | 228/219 X |
| 3,342,666 | 9/1967 | Hull | 228/181 X |
| 3,346,933 | 10/1967 | Lindsay | 228/182 X |
| 3,375,570 | 4/1968 | Dubusker et al. | 228/219 X |
| 3,469,304 | 9/1969 | Medsker | 228/219 X |
| 3,479,731 | 11/1969 | Mantel et al. | 228/248 |
| 3,596,346 | 8/1971 | Berkley | 228/261 X |
| 3,656,224 | 4/1972 | Blair et al. | 228/181 |
| 3,722,071 | 3/1973 | Van Orsdel | 228/181 |
| 3,880,608 | 4/1975 | Haarbye | 228/219 X |
| 4,025,035 | 5/1977 | Jonason | 228/261 X |
| 4,053,969 | 10/1977 | Bayard | 228/181 X |
| 4,065,341 | 12/1977 | Cub | 156/187 |
| 4,072,262 | 2/1978 | Godrick et al. | 228/183 X |
| 4,098,722 | 7/1978 | Cairns et al. | 29/157 R |
| 4,223,826 | 9/1980 | Usui | 228/219 X |
| 4,231,508 | 11/1980 | Wagner | 228/219 |

FOREIGN PATENT DOCUMENTS 9228 of 1911 United Kingdom ........... 29/163.5 F

OTHER PUBLICATIONS

Van Nostrand's Scientific Encyclopedia, Fourth Edition; D. Van Nostrand Company, Inc.; Princeton, New Jersey, (1968); p. 236.
Webster's New World Dictionary, Second College Edition; The World Publishing Company, New York, New York, (1972); pp. 172-173.

Primary Examiner—Howard N. Goldberg
Assistant Examiner—Ronald S. Wallace
Attorney, Agent, or Firm—Barnes & Thornburg

[57] ABSTRACT

A carrier matrix for use in the manufacture of a catalytic reactor for the purification of exhaust gases in an internal combustion engine of a motor vehicle is prepared by joining in wound form a corrugated steel sheet and a generally flat steel sheet, the sheets being joined in locations where they contact one another by the use of solder or brazing material. In one embodiment solder is applied in spots along the tops of the arches of the corrugated sheet, and after coiling the solder is activated by heating. In another embodiment, coiling is first carried out and then soldering is accomplished by the application of solder into one or both end faces of the coil.

5 Claims, 14 Drawing Figures

METHOD FOR MANUFACTURING A CATALYTIC REACTOR CARRIER MATRIX

This is a continuation of application Ser. No. 156,486, filed June 4, 1980, now U.S. Pat. No. 4,381,590, issued May 3, 1983.

FIELD OF INVENTION

The present invention relates to the manufacuture of a carrier or supporting matrix for a catalytic reactor designed for cleaning or purifying the exhaust gases in the internal combustion engines of motor vehicles, which carrier or supporting matrix is formed of high-temperature resistant steel sheets coated with a catalyst material, whereby the afore-mentioned steel sheets are provided as flat or planar and as corrugated sheets and are alternately placed in layers or stacks.

BACKGROUND OF INVENTION

A carrier or supporting matrix of this type is known from the British Pat. No. 1,452,982. In connection with this matrix, it has already been proposed that the individual layers or stacks of the steel sheets be either spot-welded or brazed together as a whole.

SUMMARY OF INVENTION

It is an object of the present invention to provide for simple, readily adaptable soldering or brazing methods which may be used for different matrix shapes for the purpose of manufacturing a carrier or supporting matrix of the type described above.

In accordance with the present invention, this object is essentially obtained as follows:
- the steel sheets are initially degreased and/or stained in a manner known per se;
- subsequent thereto prior to the layering or stacking of the steel sheets, at least one each of the flat and of the corrugated steel sheets is provided with an application or coating of soldering material;
- the soldering is applied either in stripes in the direction of the corrugations of the corrugated steel sheets, or at right angle thereto; and
- thereafter a simultaneous soldering together of all the layers with respect to each other takes place by heating the matrix.

According to a further development of this method, it is advantageous that, from storage reservoirs being filled with liquid soldering paste, solder is applied to the flat or planar steel sheet by way of wetting rollers prior to the winding or rolling together of the steel sheets constituting the supporting matrix.

For the purpose of saving solder, it is advantageous that the solder is applied only in narrow strips extending in the longitudinal direction of the flat or smooth steel sheet.

According to a modified embodiment of the present invention, it is advantageous—particularly for manufacturing a carrier or supporting matrix rolled up or coiled spirally or helically to form a cylindrical honeycomb structure—to apply solder to the tops or arches of the corrugated steel sheet from a storage reservoir being filled with liquid soldering paste using wetting rollers, prior to the winding together of the steel bands forming the matrix.

In accordance with a first embodiment of the invention, the solder is applied over the entire length of each arch. According to a modified embodiment, on the other hand, the solder is applied only over either one or several lengths of each top of the corrugated steel sheet.

For the purpose of improving the soldering connection it is advantageous, according to a further development of the present invention, to apply, prior to the application of the solder and with the aid of a wetting device, a binding agent or an adhesive at least to those places which are later to be provided with an application of solder.

The solder application is expediently made by means of a pulverulent solder using a distributing device. In a further development of this method strainers are used for distributing the pulverulent solder. In a still further development of this method, shaking devices are used for distributing the pulverulent solder. According to a modified embodiment of this method, atomizers are employed for distributing the pulverulent solder.

According to another embodiment of the present invention, either one or several soldering bands are inserted—prior to the alternate layering of the smooth and corrugated steel sheets—into the individual layers, for example, in the longitudinal direction of the smooth steel sheets. It is particularly expedient to insert the soldering bands parallel with respect to each other.

According to an advantageous further development of this method, the smooth and the corrugated steel sheets are so coiled to form a cylindrical honeycomb element that the outermost layer of the supporting matrix is formed by a corrugated band.

According to a still further inventive method, which is designed for manufacturing a carrier or supporting matrix for a catalytic reactor for use in conjunction with an internal combustion engine, the smooth and the corrugated steel sheets are initially wound or coiled up to form a cylindrical honeycomb element. Thereafter either one or both end faces of the coiled honeycomb element are immersed into a container holding a binding agent, and the required amount of solder in the form of a powder is uniformly applied thereto by means of a strainer.

According to another inventive method, the smooth and the corrugated steel sheets are initially coiled to form a cylindrical honeycomb element, and thereafter a soldering paste— consisting of soldering powder and a binding agent and having a suitable viscosity—is applied with a roller to either one or both end faces of the wound-up honeycomb element.

According to yet another inventive method, the smooth and the corrugated steel sheets are first wound up or coiled to form a cylindrical honeycomb element, and thereafter either one or both end faces of the coiled honeycomb element are immersed or dipped into a container holding liquid soldering paste.

In a further development of this method, the smooth and the corrugated steel sheets are first wound up to form a cylindrical honeycomb element, and thereafter a soldering foil having a specific thickness in pressed into at least one end face of the wound-up honeycomb element.

According to a modified embodiment of this last method, the smooth and the corrugated steel sheets are first wound up to form a cylindrical honeycomb element, and thereafter a predetermined amount of solder is injected by means of a solder-injecting gun into one end face of the wound-up honeycomb element.

According to a still further modified embodiment of the method, either one or both end faces of the wound-up or coiled honeycomb element heated to the soldering temperature are immersed into molten solder up to a specific depth.

In a still further modified embodiment of the method according to the present invention, the smooth and the corrugated steel sheets are first wound up to form a cylindrical honeycomb element, an auxiliary e.g. soldering material is then melted down by means of an electric arc, and subsequently sprayed on to either one or both end faces of the wound-up honeycomb element by means of a compressed air jet. In an advantageous manner, the auxiliary material is conveyed to the flame spraying process in the form of a wire.

According to an advantageous measure in this process, a flame spraying gun known per se is moved relative to the front side of the honeycomb element. According to yet another modified embodiment, the auxiliary material is conveyed to the acetylene-oxygen-compressed-air process in the form of powder.

BRIEF DESCRIPTION OF DRAWING

The method of the present invention, its various modifications and further developments will now be further described hereinafter on the basis of the accompanying schematic drawings, wherein.

DETAILED DESCRIPTION OF EMBODIMENTS

Figure 1:
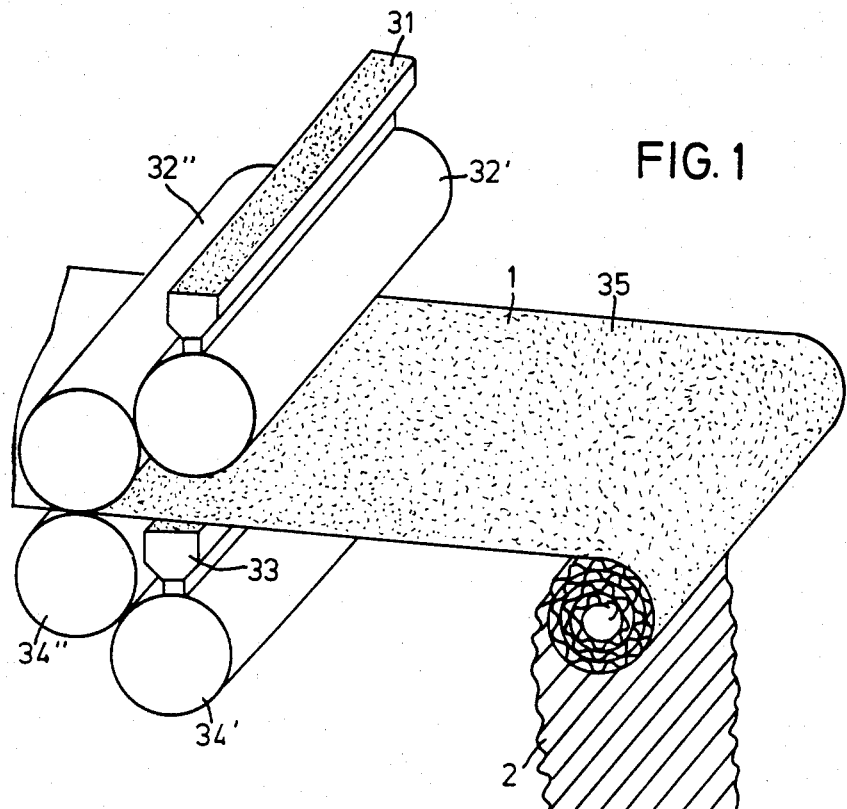
FIG. 1 illustrates the application of liquid soldering paste to a flat steel sheet.
Figure 2:
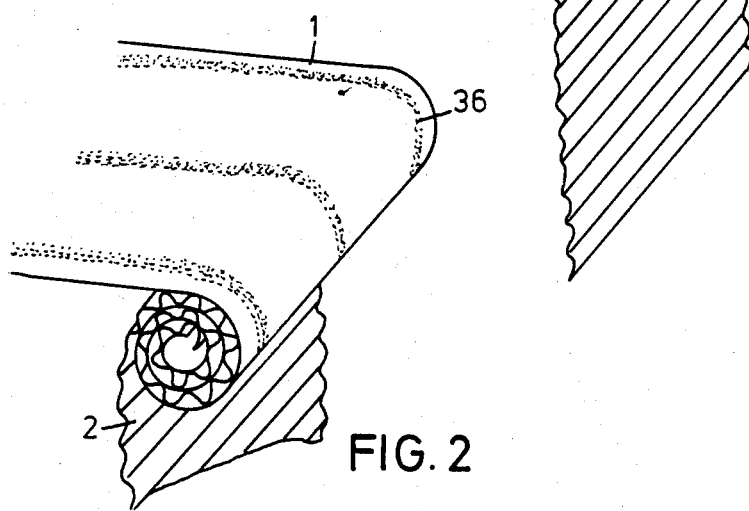
FIG. 2 illustrates liquid soldering paste applied in narrow strips.

In the method illustrated in FIGS. 1 and 2, a solder layer 35 is applied from a storage reservoir 31 containing liquid soldering paste—with the aid of wetting rollers 32', 32"—to a smooth or flat band 1 on the entire surface thereof. A corrugated band 2 is conveyed in a corresponding manner and the two bands 1 and 2 are then wound or rolled together to form a honeycomb element. As shown in FIG. 1, the second or under surface of the smooth band 1 may also be provided with a solder layer 35 with the aid of wetting rollers 34', 34" which are supplied with liquid soldering paste from a second solder reservoir 33.

In a partial section according to FIG. 2, it is shown that in the place of the complete-surface solder layer 35, the solder may also be applied merely in narrow strips 36 extending in the longitudinal direction of the smooth steel sheet 1.

In connection with the application of the solder onto the smooth band 1 there results the advantage that, when inserting the wound-up or coiled honeycomb element and/or supporting matrix 13 into an outer shell or envelope 4 (see FIG. 7), the latter may be soldered together with the matrix core over the entire circumference when the last layer of the core is the smooth band.

Figure 3:
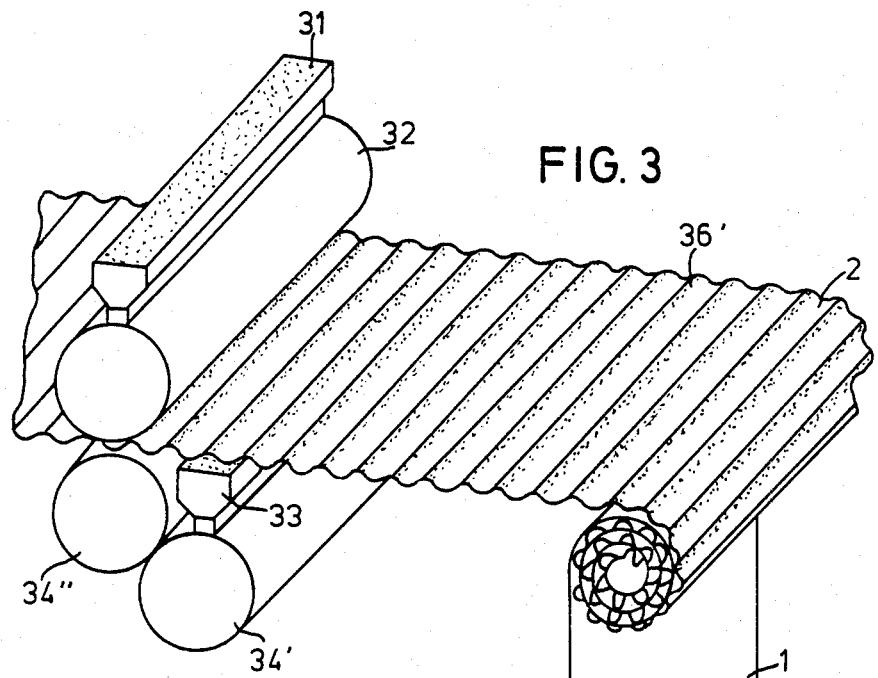
FIG. 3 illustrates the application of liquid soldering paste to the tops or arches of corrugated steel sheet.
Figure 4:
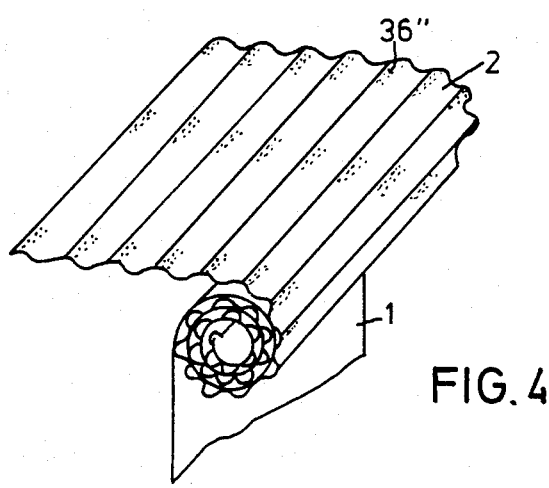
FIG. 4 illustrates solder applied over one or several partial lengths of each arch.

In the embodiments illustrated in FIGS. 3 and 4, the corrugated band 2, rather than the smooth band 1, is advantageously wetted with solder by way of suitable wetting rollers 32 and/or 34', 34". The wetting rollers 34', 34" and/or 32 are supplied with solder from storage reservoirs 31 and 33. In this case, only the tops or arches of the corrugated band 2 are wetted with solder 36' linearly (FIG. 3) across the width of the band or with solder 36" punctiformly (FIG. 4) across only small portions of the width of the band. It is guaranteed thereby that, in the event of a minimal availability of solder, the solder is present in each case only at those places where there exists contact with respect to the smooth band 1.

In both embodiments according to FIGS. 1 and 2 and/or FIGS. 3 and 4, it is possible, by virtue of a specific solder supply or a specific construction of the solder-distributing rollers or rolls, to bring about the application of the solder either over the entire width of the band, or only partially across its width. The partial application of the solder resulting in an adequate mechanical and thermal stability has, in addition to the advantage of reduced consumption of solder, the additional advantage that the base material is covered by solder only to a small extent so that in view of the coating which is to follow the properties of the base material are substantially retained.

When the application of solder has taken place, the two bands 1 and 2 are wound or coiled in a known manner to form a metallic honeycomb element, inserted into the shell 4 and soldered together in an oven.

Figure 5:
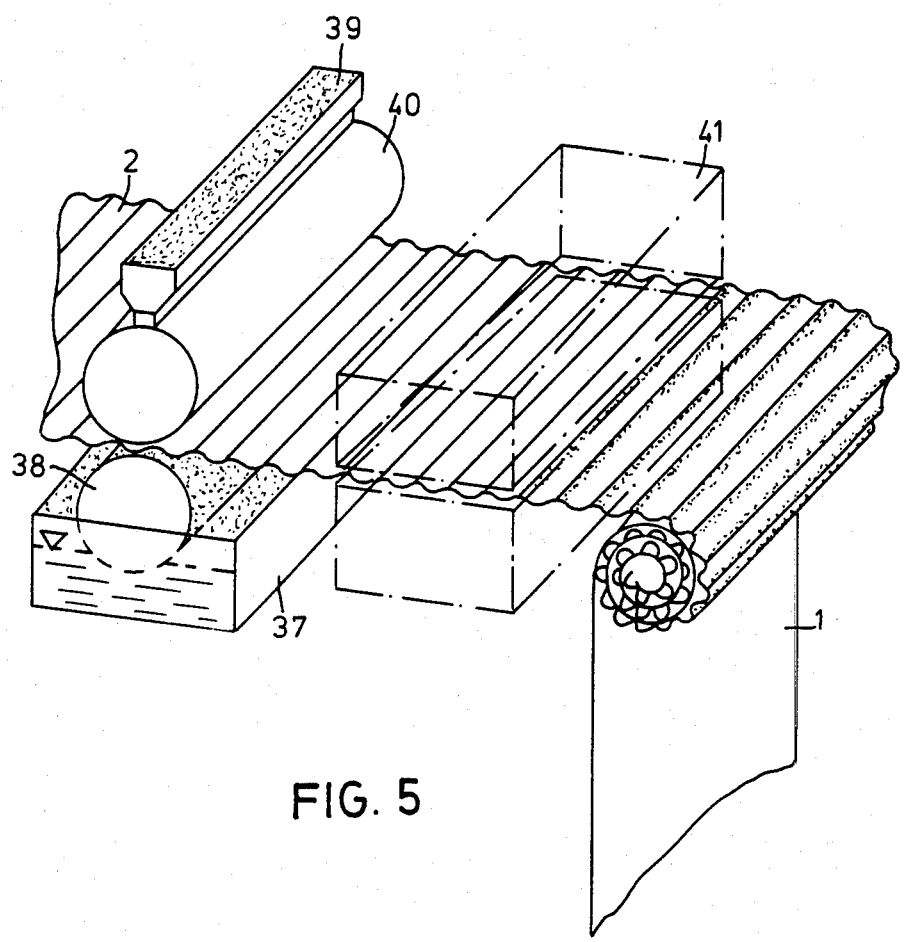
FIG. 5 illustrates the application of the solder after a wetting of the steel sheet by a binding agent or an adhesive.

In accordance with a modified version of the coating process, the smooth band 1 and/or the corrugated band 2—rather than being coated with a liquid soldering paste which often-times does not have a good adhesiveness on the metallic surfaces of the bands 1 and 2—is provided first with a specific binding agent or adhesive using corresponding wetting devices, namely reservoirs 37, 39 and a binding agent-applying roll 38 and 40, as shown in FIG. 5. As binding agent for the better adhesion of the solder it is possible to employ, water-based known binding agents. In a distributing device 41, pulverulent solder is then finely distributed over the so treated band. It is possible to provide for this purpose strainers, shaking devices, atomizers, or the like (not shown herein). The solder will then adhere to those areas to which the binding agent had previously been applied. Only after this solder application are the bands then wound up or coiled.

Figure 6:
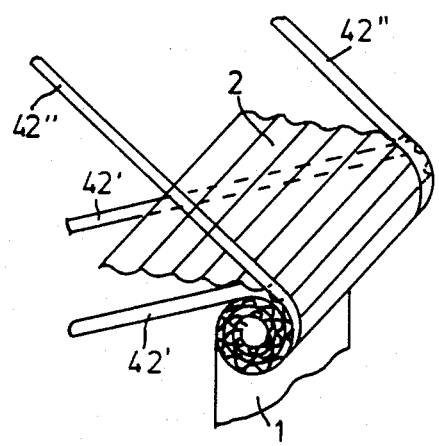
FIG. 6 illustrates the insertion of one or several soldering bands, in this instance in the longitudinal direction of the steel sheets.

In the process illustrated in FIG. 6, either one or several soldering bands 42', 42"—depending upon the solder needed and/or the stability or hardness required—are inserted, during the winding of the matrix, between the smooth band 1 and the corrugated band 2 and then placed concomitantly into the individual windings.

Figure 7:
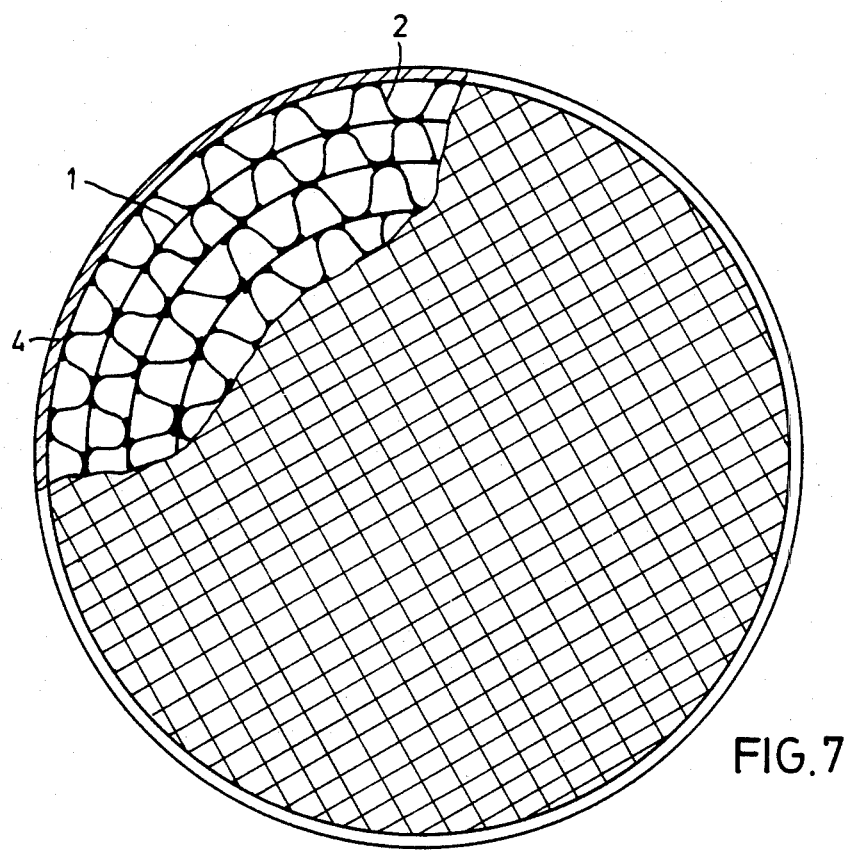
FIG. 7 illustrates an embodiment in which the outermost layer of the carrier or supporting matrix is formed by a corrugated band.

Schematically shown in FIG. 7 in a partial cross-sectional view is the finished carrier or supporting matrix 13 within the shell or jacket 4 in which the last matrix layer consists of a corrugated band 2 soldered to the shell 4. To achieve such soldering to the shell 4, a meniscus is formed between the inner surface of the shell or jacket 4 and the wave crests or combs during the soldering operation, which meniscus constitutes a particularly firm soldering connection between the outer layer and the shell or jacket 4.

Figure 8A:
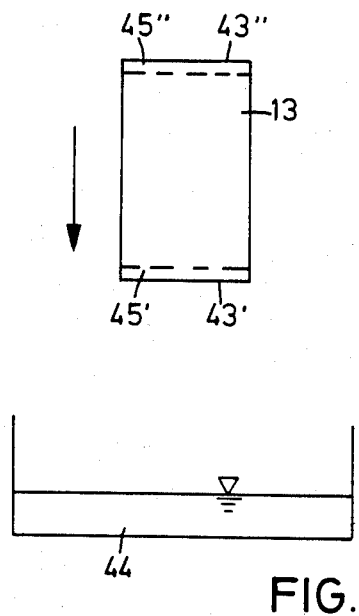
FIGS. 8a to 8d illustrate method steps for applying a solder onto either one or both end faces of a wound-up or coiled honeycomb element.
Figure 8B:
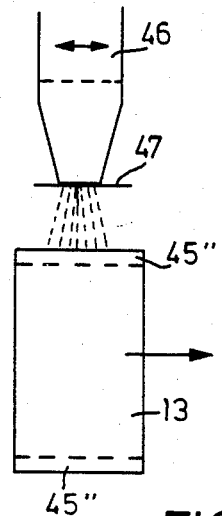
Figure 8C:
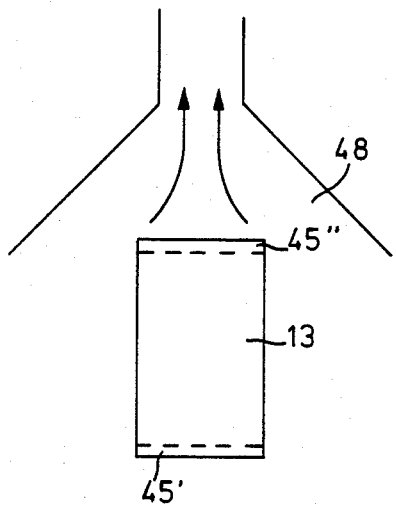
Figure 8D:
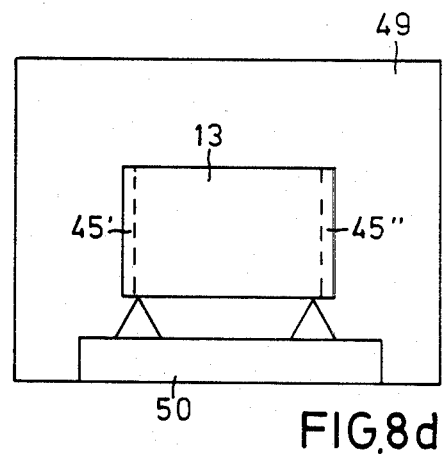

In the process steps illustrated in FIGS. 8a to 8d, the solder is applied to the front sides of a wound-up or coiled supporting matrix 13 formed from smooth and corrugated bands 1 and/or 2. In FIG. 8a, the supporting matrix 13 is dipped, after cleaning and degreasing operations, into a dipping bath 44 containing a binding agent with the end faces 43' and/or 43", so that as a result wetted zones 45', 45" will be produced. The coating with solder takes place, according to FIG. 8b, from a reservoir 46 for powdery solder, and by way of a strainer 47 the solder is applied to the wetted surfaces 45' and/or 45" positioned on the front side. It is possible to additionally provide within the reservoir 46 for powdery solder, or connected therewith, shaking or vibrating devices, stirring devices, or the like. During the next process step (FIG. 8c), the supporting matrix 13 is dried within a drying chamber 48. Thereafter, the soldering operation is carried out in vacuo and/or in protective gas, i.e. within a corresponding chamber 49 containing a heater 50, according to FIG. 8d.

It has been found to be particularly advantageous that both end faces of the wound-up or coiled honeycomb element 13 are dipped into the binding agent 44 to a depth of about 10 mm and that the required quantity of solder is uniformly applied by means of the sieve or screen strainer 47. The uniform distribution of solder may be made by means of either one or several soldering funnels 46 being disposed in tandem with the strainer 47. In this case, the honeycomb elements 13 are conveyed—depending upon the desired quantity of solder— correspondingly rapidly under the soldering funnel and/or funnels 46 by means of a conveyor belt (not shown herein). The solder falls into the honeycomb element 13 and adheres to the previously dipped binding agent. An amount of solder of approximately 8 to 10 grams per matrix is required to achieve a soldering or brazing having sufficient hardness. In order to prevent an agglutination or gumming-up of the solder within the solder reservoir 46 and/or in the strainer or screen 47, particular attention must be paid to assure that the ambient air is as dry as possible.

In a modified method, the smooth and the corrugated steel sheets 1 and/or 2 are equally wound up or coiled first to form a cylindrical honeycomb element. In vacuo and/or in a protective gas atmosphere, either one or both end faces of the wound-up honeycomb element, which has previously been heated to the soldering temperature, are dipped into molten solder up to a specific depth. Any excess solder is removed by briefly tapping the honeycomb element. Residual solder will remain within the soldering gap because of the capillary and/or wetting effects.

Figure 9A:
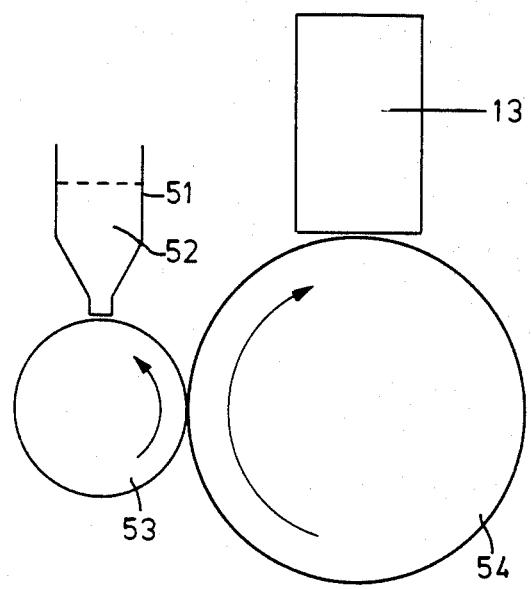
FIGS. 9a and 9b illustrate the application of a soldering paste on to either one or several end faces of a matrix.
Figure 9B:
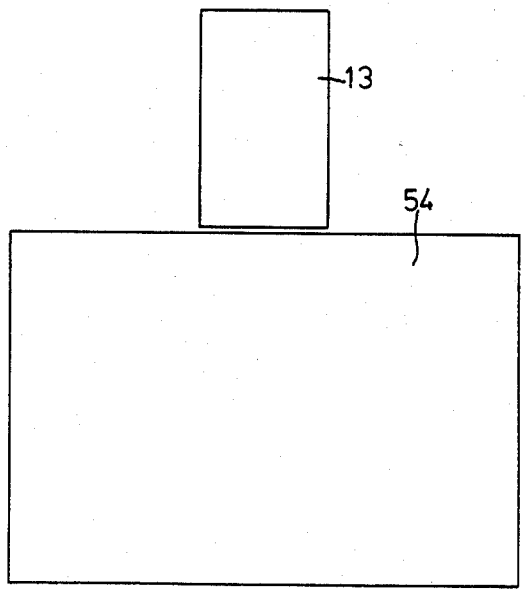

A modified method is illustrated in FIGS. 9a and 9b. In this case, a soldering paste 52 is rolled onto the matrix 13 on the front side thereof from a reservoir 51 housing the soldering paste and by means of applying rollers 53 and/or 54. At that time, the matrix is pressed with a corresponding contact pressure against the relatively soft applying roller 54. The soldering paste, a mixture of powdered solder and binding agent having a specific viscosity, is applied in this case to the front side of the honeycomb element 13 and is deposited within the inner honeycomb side at a depth of approximately 5 mm. In this connection, attention must be paid to an exact positioning of the solder since an excessive supply of solder may lead to alloying. The feeding of the honeycomb element may be accomplished, for example, by means of a conveyor belt.

According to a modified embodiment of the method (which has not been shown herein), the supporting matrix 13 on the front side thereof may be dipped via a stop into a thinly liquid soldering paste to such a depth that the amount of solder which is required (approximately 8 to 10 grams) may agglutinate in the honeycombs. By means of an overflow in the solder container, the same solder level is guaranteed.

It is also possible to inject a precisely dosed amount of solder by means of a solder-spraying gun into the honeycomb element 13 on the front side thereof. In this case, the solder-binding agent-mixture is deposited on the honeycomb walls. When this is done, the rear of the honeycomb element 13 is covered up in order to prevent the solder from being sprayed through. The spraying jet of the spray gun is set in such a manner that a uniform distribution of the solder is assured.

Figure 10:
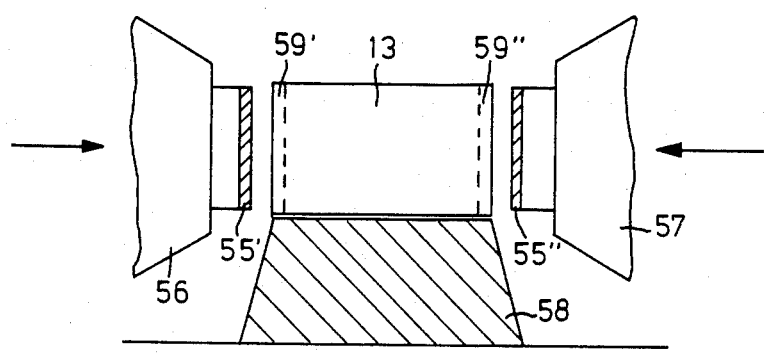
FIG. 10 illustrates the pressing-in of a soldering foil into at least one end face of a wound-up or coiled honeycomb element.

According to a still further modified embodiment of the method, which is shown in FIG. 10, solder foil 55' and 55" of predetermined thickness is pressed into the supporting matrix 13 on the front side thereof. In this case, the front side of the supporting matrix 13, which rests expediently on a support 58, is pressed into the solder foil a specific distance corresponding to the quantity or amount of solder needed, i.e. the foil is pressed into the wound-up honeycomb element to such an extent that the solder will remain during the soldering operation within the individual honeycombs. The pressing-in of the solder takes place with the aid of pressing devices 56 and/or 57, whereby layered or coated zones 59' and 59" will be produced. The advantage of this variant consists in that an exactly uniform amount of solder is utilized.

According to another variant of the inventive method or process (which has not been illustrated herein), in an electric arc-compressed-air process, an auxiliary material, for example, NiAl wire (95% Ni, 5% Al) in the form of a wire is melted down by means of an electric arc and sprayed by means of a compressed-air jet onto the honeycomb element on the front side thereof. The individual particles having been sprayed on will weld together and interlink on the front-side of the bearing points of the individual bands 1 and/or 2. As a consequence of the exact reaction of aluminum in the auxiliary material and of the base material, a firm adhesion of the sprayed coating is produced. During the spraying, the flame spraying gun may be moved in an undulating fashion over the surface of the matrix, and/or the matrix may be guided past the flame spraying jet. The wire weight to be sprayed on must be proportioned accurately in order to prevent an obstruction of the honeycomb passages, while providing adequate hardness.

The acetylene-oxygen compressed-air process may be alternatively employed. In that case, NiAl 955 in powdered form is sprayed on as the auxiliary material. The advantage of this process consists in a reduced spraying loss during the coating application.

The present invention is not limited to the method steps and features illustrated and described herein. Rather, it encompasses also all the modifications and further developments which are the province of one skilled in the art, as well as partial and sub-combinations.

What is claimed is:

1. In a method for manufacturing a carrier or supporting matrix for a catalytic reactor designed for cleaning or purifying the exhaust gases in an internal combustion engine of a motor vehicle, the reactor comprising high temperature resistant steel sheets coated with a catalyst material, said steel sheets comprising a first relatively flat sheet and a second corrugated sheet alternately disposed in layers, the individual layers of the steel sheets being soldered together, the improvements comprising:

(a) providing at least a cleaned portion of each of said flat and corrugated steel sheets;

(b) applying a binding agent to the flat sheet along selected areas of said cleaned portion thereof;

(c) applying a predetermined amount of pulverent solder to the selected areas on which binding agent has been applied, said selected areas being strips extending in the direction of corrugations of the corrugated steel sheets, or at right angles thereto, so that solder is present only in the vicinity of said strips and a substantial area intermediate the strips is free of solder;

(d) subsequently coiling the flat and the corrugated steel sheets to form a honeycomb element wherein said selected areas with a predetermined amount of solder thereon are adjacent cleaned portions of the opposing surface of said alternately disposed sheet; and (e) thereafter sumultaneously soldering together all the layers with respect to each other by heating up the matrix such that said solder adheres to said adjacent cleaned portion.

2. A method according to claim 1, wherein said applying of solder includes applying solder only to narrow strips extending in the longitudinal direction of the flat steel sheet.

3. In a method for manufacturing a carrier or supporting matrix for a catalytic reactor designed for cleaning or purifying the exhaust gases in an internal combustion engine of a motor vehicle, the reactor comprising high temperature resistant steel sheets coated with a catalyst material, said steel sheets comprising a first relatively flat sheet and a second corrugated sheet alternately disposed in layers, the individual layers of the steel sheets being soldered together, the improvements comprising:

(a) providing at least a cleaned portion of each of said flat and corrugated steel sheets;

(b) applying a binding agent to the corrugated sheet along selected areas of said cleaned portion thereof;

(c) applying a predetermined amount of pulverent solder to the selected areas on which binding agent has been applied, said selected areas being strips along the tops of the corrugations, said strips extending in the direction of corrugations of the corrugated steel sheets, or at right angles thereto, so that solder is present only in the vicinity of said strips and a substantial area intermediate the strips is free of solder;

(d) subsequently coiling the flat and the corrugated steel sheets to form a honeycomb element wherein said selected areas with a predetermined amount of solder thereon are adjacent cleaned portions of the opposing surface of said alternately disposed sheet; and (e) thereafter simultaneously soldering together all the layers with respect to each other by heating up the matrix such that said solder adheres to said adjacent cleaned portion.

4. Method according to claim 1, wherein the applying of solder includes applying solder over the complete length of each corrugation top.

5. Method according to claim 1, wherein the applying of solder includes applying solder to one or more parts of the length of each corrugation top.